US009990165B2

(12) United States Patent
Fernandes et al.

(10) Patent No.: US 9,990,165 B2
(45) Date of Patent: Jun. 5, 2018

(54) SIMPLIFIED WOOBE EXPERIENCE

(71) Applicant: HEWLETT-PACKARD DEVELOPMENT COMPANY, L.P., Fort Collins, CO (US)

(72) Inventors: Lenin Fernandes, Bangalore (IN); Rajesh Bhatia, Bangalore (IN); Ganesan Kumaravel, Bangalore (IN)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days. days.

(21) Appl. No.: 14/765,230

(22) PCT Filed: Jan. 31, 2013

(86) PCT No.: PCT/US2013/023976
§ 371 (c)(1),
(2) Date: Jul. 31, 2015

(87) PCT Pub. No.: WO2014/120168
PCT Pub. Date: Aug. 7, 2014

(65) Prior Publication Data
US 2015/0363141 A1 Dec. 17, 2015

(51) Int. Cl.
*G06F 3/12* (2006.01)
*H04W 4/00* (2018.01)

(52) U.S. Cl.
CPC .......... *G06F 3/1204* (2013.01); *G06F 3/1224* (2013.01); *G06F 3/1288* (2013.01);
(Continued)

(58) Field of Classification Search
None
See application file for complete search history.

(56) References Cited

U.S. PATENT DOCUMENTS

2006/0268805 A1* 11/2006 Kawai ................... G06F 3/1204
370/338
2007/0245358 A1* 10/2007 Hattori .................. G06F 3/1204
719/321
(Continued)

FOREIGN PATENT DOCUMENTS

WO WO-2011115987 A2 9/2011

OTHER PUBLICATIONS

Wirth Consulting http://wirthconsulting.org/2012/05/21/review-hps-eprint-print-driver-for-windows/ (May 2012).*
(Continued)

*Primary Examiner* — Huo Long Chen
(74) *Attorney, Agent, or Firm* — HP Inc. Patent Department

(57) ABSTRACT

A system and method for cloud centric Web out-of-box print experience (WOOBPE) for Web connected printers are disclosed. In one example, a printer is registered with a cloud print service upon the printer coupling to a network. A WOOBPE application is then launched via a computing device to obtain a network identification (ID) of the printer. A user account is then created with WOOBPE service providers for a user of the printer upon obtaining printer specific information using the network ID. Printer email ID is then provided and the printer email ID is then activated and a test page is printed based on the printer specific information. The printer is then claimed by sending the printer specific information to the WOOBPE service providers for subscribing to one or more print services and associating the printer specific information with the created user account.

20 Claims, 3 Drawing Sheets

(52) U.S. Cl.
CPC .......... *G06F 3/1292* (2013.01); *H04W 4/003* (2013.01); *H04W 4/60* (2018.02)

(56) References Cited

U.S. PATENT DOCUMENTS

| | | |
|---|---|---|
| 2010/0171973 A1 | 7/2010 | Kimura |
| 2011/0176162 A1 | 7/2011 | Kamath et al. |
| 2011/0235085 A1* | 9/2011 | Jazayeri ................ G06F 3/1204 358/1.14 |
| 2012/0140285 A1 | 6/2012 | Kamath et al. |
| 2012/0229845 A1 | 9/2012 | Maekawa et al. |
| 2012/0236359 A1 | 9/2012 | Mihara |
| 2012/0250065 A1 | 10/2012 | Partridge et al. |
| 2012/0274979 A1 | 11/2012 | Uchida |
| 2012/0300249 A1 | 11/2012 | Shustef et al. |
| 2013/0185364 A1* | 7/2013 | Bhatia .................. G06Q 10/107 709/206 |

OTHER PUBLICATIONS

Pre-registration of printer email ID for webconnected printers Research Disclosure database No. 583074 Published in the Nov. 2012 paper journal.*
Getting Started with HP ePrint https://www.youtube.com/watch?v=g7c1XgAIDWU (Feb. 2012).*
International Searching Authority, International Search Report & Written Opinion, dated Oct. 31, 2013, 9 pages.
Kodak Office Hero 6.1 All-in-One Printer—Extended User Guide, 2012, pp. 1-14, Available at: <resources.kodak.com/support/shtml/en/manuals/urg01259/urg01259c3s2.shtml>.

* cited by examiner

SIMPLIFIED WOOBE EXPERIENCE

CROSS-REFERENCE TO RELATED APPLICATION

This application is a national stage application under 35 U.S.C. § 371 of PCT/US2013/023976, filed Jan. 31, 2013.

BACKGROUND

Currently, setting up a web connected printer by registering with ePrint Center/Cloud for print services, such as email printing, scheduled printing, print applications (apps) and so on, is a very cumbersome process, which can lead to a bad user experience. Further, the current process is very personal computer (PC) centric, which requires downloading, installing and running the printer software. Furthermore, the current process requires a maintenance overhead of the printer software.

When a user purchases a new printer, Web out-of-the-box print experience (WOOBPE) assists in registering the printer, account creation with a service provider and claiming the printer with the service provider so that the user can start using the defined set of services. However, this process is tightly coupled with service provider.

BRIEF DESCRIPTION OF THE DRAWINGS

Examples of the invention will now be described in detail with reference to the accompanying drawings, in which.

The drawings described herein are for illustration purposes only and are not intended to limit the scope of the present disclosure in any way.

DETAILED DESCRIPTION

A system and method for providing cloud centric Web out-of-the-box print experience (WOOBPE) for Web connected printers are disclosed. In the following detailed description of the examples of the present subject matter, references are made to the accompanying drawings that form a part hereof, and in which are shown by way of illustration specific examples in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present subject matter is defined by the appended claims.

The term "WOOBPE" is the experience user has during a setup process of installing and/or performing initial configuration of a Web connected printer.

Figure 1:
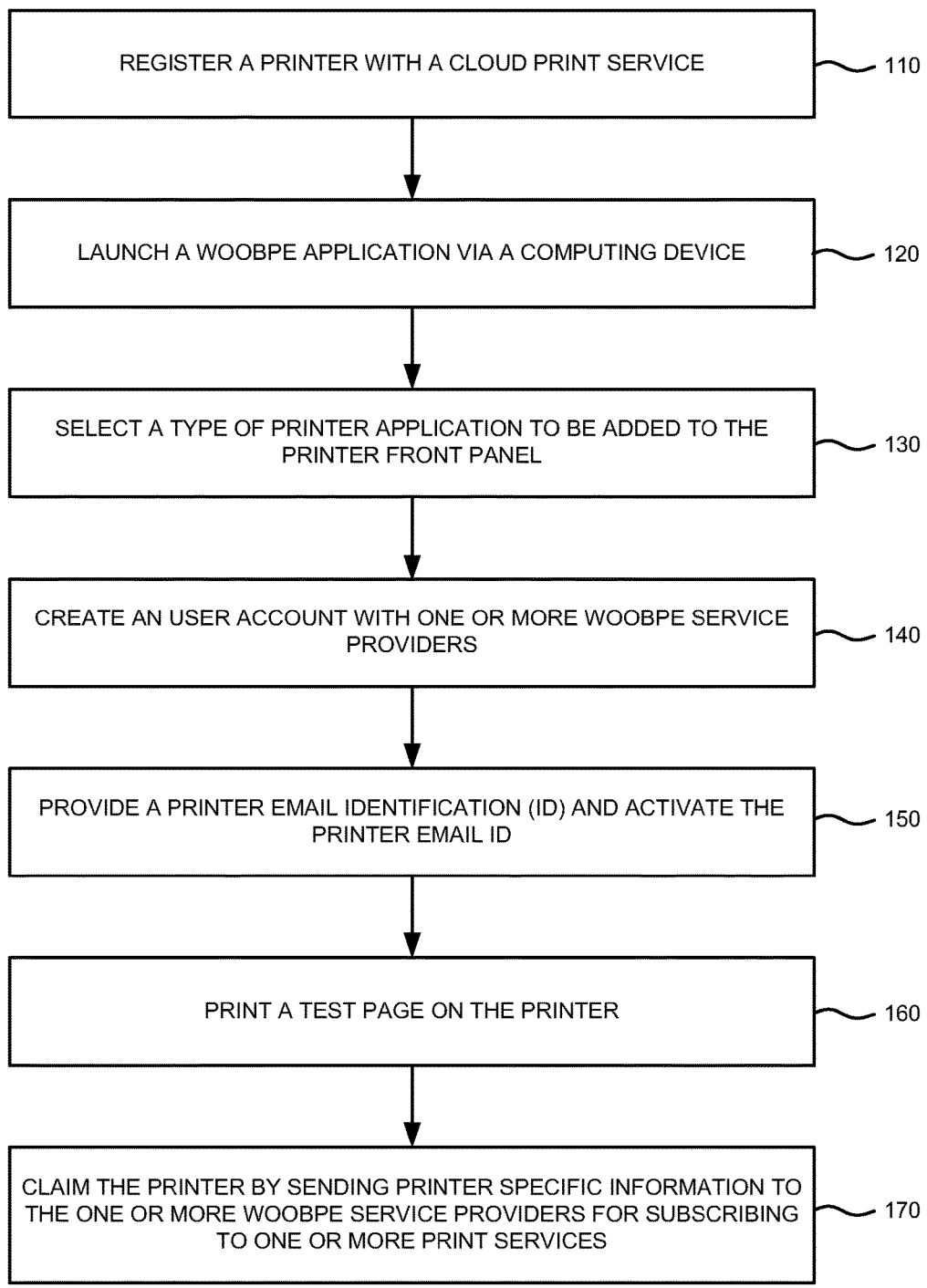
FIG. 1 illustrates a flow diagram of an exemplary method for providing cloud centric Web out-of-the-box print experience (WOOBPE)

FIG. 1 illustrates a flow diagram 100 of an exemplary method for providing a cloud centric WOOBPE for Web connected printers. At block 110, a printer is registered to a cloud print service upon the printer coupling to a network, such as a local area network (LAN), a wide area network (WAN) and the like. For example, the printer is automatically registered to the cloud print service upon the printer coupling to the network without the user's awareness. In some embodiments, some unique information is provided by the printer for identification upon coupling to the network. Exemplary unique information includes a serial number, a model number, a hardware address and the like. The printer is then authenticated using a registration domain and a registration key. For example, the registration domain and the registration key are usually common for printers of the same model or the same embedded firmware platform version. A unique printer identification (ID) and a key pair are then received by the printer upon authentication. The unique printer ID and the key pair are stored securely in the printer for any further printer and cloud print service transactions except for re-registration.

In some embodiments, the user is presented with an option to select "ePrint" on the printer panel and upon selecting the ePrint option the user is presented with an end user license agreement (EULA) for acceptance. In this embodiment, the printer is registered upon the printer coupling to the network and the acceptance of EULA by the user.

At block 120, a WOOBPE application is launched by the user via a computing device to obtain a network ID, such as an internet protocol (IP) address of the printer. Exemplary computing device includes a personal computing device, a mobile computing device and the like. For example, the WOOBPE application is an application, running on the computing device, for discovering the printer. In some embodiments, user inserts a setup CD on the personal computing device, which triggers the WOOBPE launch process to obtain the network ID of the printer. In some embodiments, the WOOBPE application is launched via the computing device by the user upon completing the registration. Available wireless devices, such as the Web connected printers are then discovered and the printer is selected to obtain the network ID of the printer upon launching the WOOBPE application.

At block 130, in some embodiments, a type of printer application, to be added to the printer front panel is selected. Exemplary printer application includes a scheduled delivery application, such as a news paper application and the like. Also, optionally white listing rules may be defined and user ID and password may be provided along with any desired print services via the Web portal.

At block 140, an user account with one or more WOOBPE service providers is created for a user of the printer upon obtaining printer specific information using the network ID. Exemplary WOOBPE service providers are enterprise service providers, social networking service and the like. In some embodiments, the printer specific information includes a unique serial number, a model number and the like.

At block 150, a printer email ID is provided and the printer email ID is activated upon successfully creating the user account. For example, the printer email ID is a unique email ID of the printer. Exemplary printer email ID includes abc@eprint.com and the like. In some embodiments, a default printer email ID with an option to personalize the printer email ID is provided via the Web portal. A personalized printer email ID is then created.

At block 160, in some embodiments, a test page is then printed on the printer upon creating the personalized printer email ID and successfully creating the user account. In some embodiments, the email ID is provided along with an option to choose to download a printer driver, selection options on the Web portal to activate the personalized email ID and then the test page is printed on the printer upon successfully creating the user account.

At block 170, the printer is claimed by sending the printer specific information to the one or more WOOBPE service providers for subscribing to one or more print services. In one exemplary embodiment, the printer specific information is obtained upon registration of the printer. The printer specific information is then sent to the WOOBPE service providers. Associated application programming interfaces (APIs) of the WOOBPE service providers are then called and through the APIs the printer is auto claimed. In another exemplary embodiment, a unique printer ID is obtained upon registration of the printer. For example, the unique printer ID is a printer ID obtained by mapping the unique serial number, model number and the like of the printer. The unique printer ID is then sent to the WOOBPE service providers. Associated application programming interfaces (APIs) of the WOOBPE service providers are then called and through the APIs the printer is auto claimed. Further, the printer specific information is associated with the created user account. In some embodiments, the WOOBPE shall have the intelligence built in to select the appropriate service provider, thereby automating the process and reducing the need for user intervention.

Figure 2:
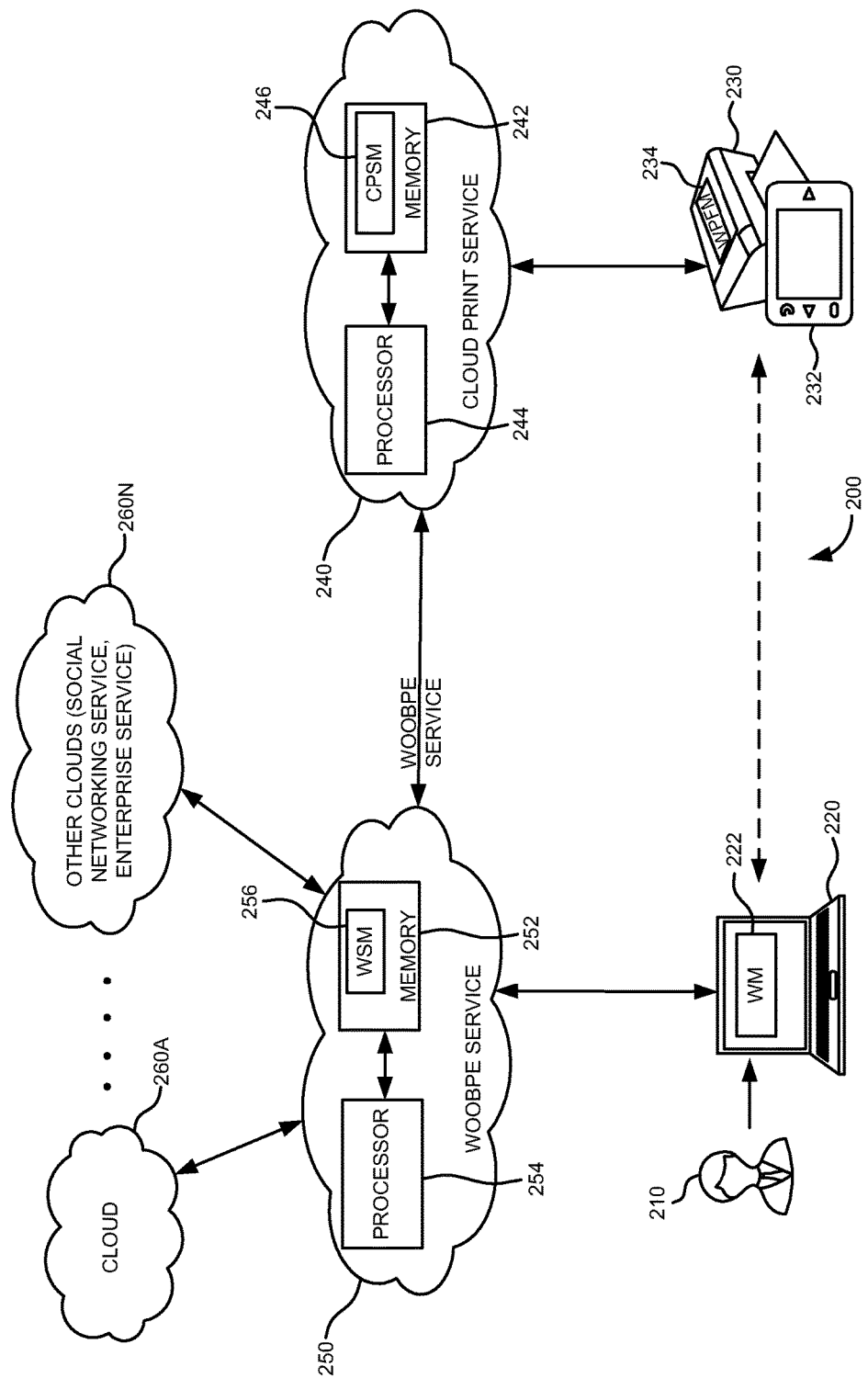
FIG. 2 shows a cloud centric WOOBPE system, accordance to an embodiment of the present subject matter.

FIG. 2 illustrates a cloud centric WOOBPE system 200, accordance to an embodiment of the present subject matter. As shown in FIG. 2, the cloud centric WOOBPE system 200 includes a user 210 of a computing device, such as a personal computing device 220, a printer 230, a cloud print service 240, a WOOBPE service 250, and one or more clouds 260, such as enterprise service, social networking service and so on. Further as shown in FIG. 2, the personal computing device 220 includes a WOOBPE module (WM) 222. For example, in the personal computing device 220, the WM 222 is a WOOBPE personal computing module (WPCM). Furthermore as shown in FIG. 2, the printer 230 includes a front panel 232 and a WOOBPE printer firmware module (WPFM) 234. Also as shown in FIG. 2, the cloud print service 240 includes a memory 242 storing a cloud print service module (CPSM) 246 and a processor 244 connected to the memory 242 to execute the CPSM 246. In addition as shown in FIG. 2, the WOOBPE service 250 includes a memory 252 storing a WOOBPE service module (WSM) 256 and a processor 254 connected to the memory 252 to execute the WSM 256. Also as shown in FIG. 2, the personal computing device 220, the printer 230, the cloud print service 240, the WOOBPE service 250 and the one or more clouds, i.e., WOOBPE service providers, such as enterprise service, social networking service and the like are all communicatively coupled with each other to carry out the cloud centric WOOBPE.

Figure 3:
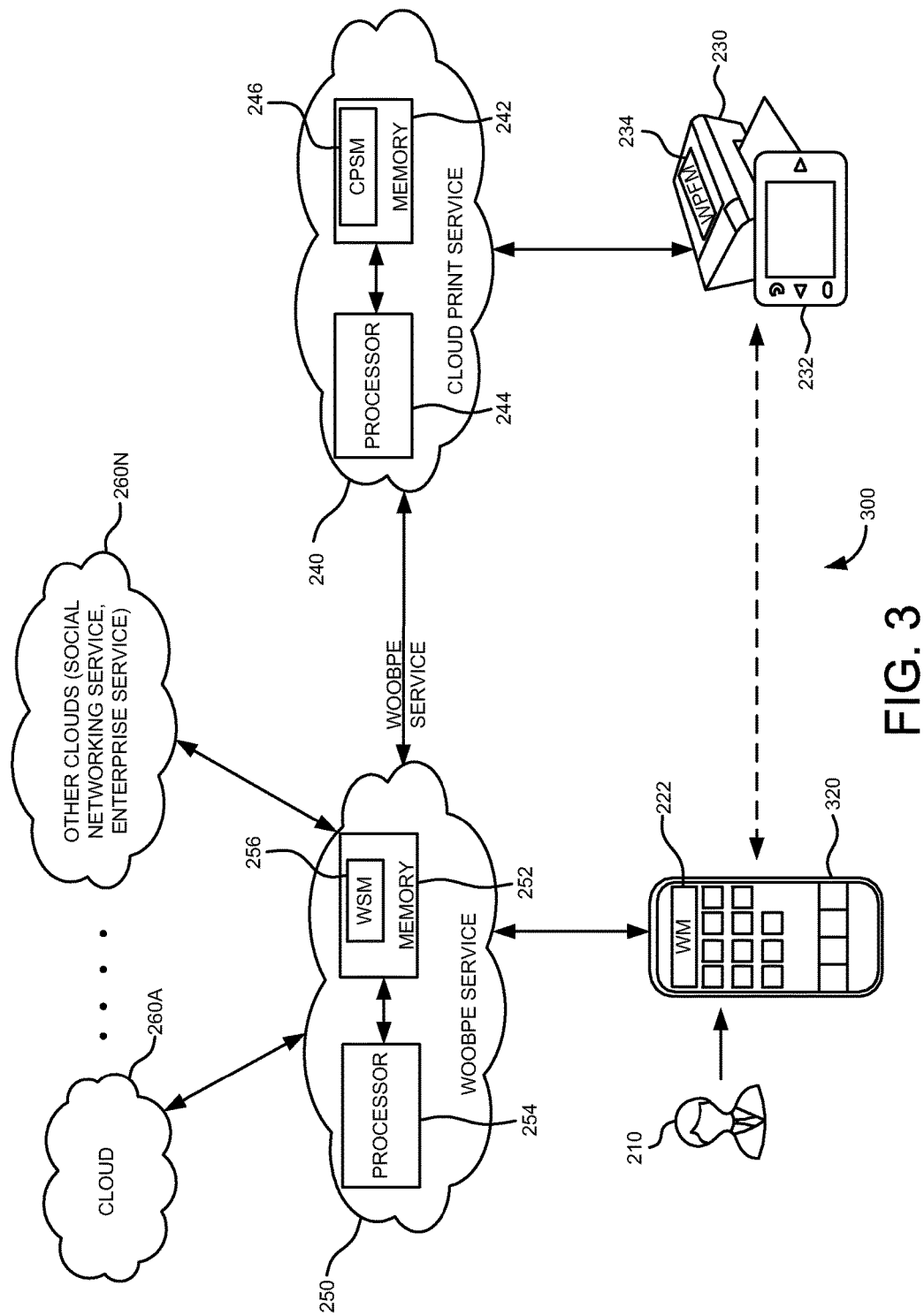
FIG. 3 shows another cloud centric WOOBPE system, accordance to an embodiment of the present subject matter.

FIG. 3 illustrates another cloud centric WOOBPE system 300, accordance to an embodiment of the present subject matter. The cloud centric WOOBPE system 300 shown in FIG. 3 is similar to the cloud centric WOOBPE system 200 shown in FIG. 2, except FIG. 3 shows using a computing device, such as a mobile computing device 320 including the WM 222. For example, in the mobile computing device 320, the WM 222 is a WOOBPE mobile computing module (WMCM). Further, it can be seen that the WOOBPE solution can be easily adapted for use via the mobile computing device 320 shown in FIG. 3 to have a cloud centric mobile out-of-the-box print experience (MOOBPE). In the MOOBPE scenario the WOOBPE application can be launched directly using an application on the mobile device.

The mobile application may use a QR code scanner or NFC tag to scan the printer 230 serial number, which can then trigger the MOOBPE flow to provide the cloud centric WOOBPE. In some embodiments, the user 210 can also manually enter the serial number in the mobile application to trigger the MOOBPE flow.

In operation, the WPFM 234 registers a printer 230 with the cloud print service 240 upon the printer 230 coupling to a network. In some embodiments, the WPFM 234 registers the printer 230 with the cloud print service 240 via the CPSM 246 upon the printer 230 coupling to the network and selecting an ePrint option on the printer 230 and accepting an end user license agreement (EULA).

The WM 222 then obtains a network ID of the printer 230 upon launching a WOOBPE application via the personal computing device 220 by the user 210. In some embodiments, the WM 222 discovers available wireless printing devices upon launching the WOOBPE application via the personal computing device 220 or the mobile computing device 320 by the user 210 upon completing the registration. The user 210 then selects the printer 230 upon launching the WOOBPE application to obtain the network ID of the printer 230.

The WMS 252 creates a user account with one or more WOOBPE service providers 260 for the user 210 of the printer 230 by obtaining printer specific information from the network ID. For example, the WMS 252 automatically creates the user account with the one or more WOOBPE service providers 260 for the user 210 of the printer 230 by obtaining the printer specific information from the network ID. Exemplary printer specific information includes a unique serial number, a model number, and the like. In some embodiments, the user 210 selects a type of printer application to be added to the printer front panel 232, defines white listing rules, user identification (id), password, and any desired print services via the Web portal.

The WSM 256 then provides a printer email ID and activates the printer email ID based on the printer specific information upon successfully creating the user account. The WSM 256 then sends a command to the CPSM 246 upon activating the email ID and in-turn the CPSM 246 sends a print command to the WPFM 234 to print a test page on the printer 230. In some embodiments, the WSM 256 provides a default printer email ID with an option to personalize the printer email ID. The user 210 then creates a personalized printer email ID via the WSM 256. The WSM 256 then sends a command via the CPSM 246 to the WPFM 234 to print a test page on the printer 230. In some embodiments, the WSM 256 provides the printer email ID and an option to choose to download a printer driver upon successfully creating the user account.

The WSM 256 then claims the printer 230 by sending the printer specific information to the one or more WOOBPE service providers 260 for subscribing to one or more print services, and wherein the one or more WOOBPE service providers 260 associate the printer specific information with the created user account.

In one embodiment, an article comprising a non-transitory computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a computer system and may be performed in any order (e.g., including using means for achieving the various operations). Accordingly, the specification and drawings are to be regarded in an illustrative rather than a restrictive sense.

In various examples, system and method described in FIGS. 1 through 3 propose a technique to provide a cloud centric WOOBPE. The technique provides a cloud centric WOOBPE without needing to download, install, and/or run any software on the printer or the personal/mobile computing device. The above technique loosely couples with enterprise print service providers. Furthermore, the above technique significantly reduces the installation time compared with the traditional techniques. The above technique eliminates the need for maintaining different versions of software for different printers, thereby reducing time and cost of installation. Also, new device enablement and printer registration can be automated, thereby eliminating the manually triggered process steps at the printer panel. In addition, if the user opts-in and get the activation code, ePrint driver/ePrint App can be automatically downloaded. Moreover, the above technique enables global white listing policy and can be easily leveraged for enterprise users.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method performed by at least one processor of a web out-of-box print experience (WOOBPE) cloud device, the method comprising:
    based on a WOOBPE application launch by a computing device of a user, obtaining from the computing device, by the WOOBPE cloud device over one or more network, a network identification (ID) of a printer, the network ID comprising printer specific information, wherein the printer is registered with a first cloud service provider, wherein the WOOBPE application launch causes the computing device to discover the printer and obtain the network ID from the printer, and wherein the user has no existing user account with a second cloud service provider;
    using the printer specific information obtained from the computing device of the user, creating, by the WOOBPE cloud device, a new user account with the second cloud service provider for the user of the computing device;
    upon a creation of the new user account with second cloud service provider, providing, by the WOOBPE cloud device, a printer email ID to the computing device;
    activating, by the WOOBPE cloud device, the printer email ID based on the printer specific information; and
    claiming, by the WOOBPE cloud device, the printer with the second cloud service provider by calling one or more associated application programming interfaces (APIs) of the second cloud service provider to send the printer specific information to the second cloud service provider and enable the second cloud service provider to associate the printer specific information with the user account in order to subscribe the user to one or more print services.

2. The method of claim 1, further comprising:
    sending, by the WOOBPE cloud device, a command to the first cloud service provider to cause the printer to print a test page upon successfully activating the printer email ID.

3. The method of claim 2, wherein the printer automatically registers with the first cloud service provider in response to the user (i) selecting an ePrint option on the printer, and (ii) accepting an end user license agreement (EULA), and wherein sending the command to the first cloud service provider causes the first cloud service provider to send a print command to the printer to cause the printer to print the test page.

4. The method of claim 1, wherein the computing device automatically launches the WOOBPE application upon scanning a near field communication (NFC) tag on the printer, and wherein the WOOBPE cloud device obtains the network ID of the printer from the computing device upon the computing device scanning the NFC tag on the printer.

5. The method of claim 1, wherein the printer specific information comprises a unique serial number and a model number of the printer.

6. The method of claim 5, wherein the printer specific information further comprises at least one of a type of printer application to be added to the printer, white listing rules for the printer, a user ID, a password, and desired print services corresponding to the second cloud service provider.

7. The method of claim 1, wherein the printer email ID provided to the computing device is a default printer email ID that enables the user to create a personalized printer email ID, and wherein activating the printer email ID comprises activating the personalized printer email ID.

8. The method of claim 1, wherein providing the printer email ID to the computing device includes providing an option enabling the user to choose to download a printer driver upon successfully creating the user account.

9. A non-transitory computer-readable storage medium storing instructions that when executed by a web out-of-box print experience (WOOBPE) cloud device, cause the WOOBPE cloud device to:
    based on a WOOBPE application launch by a computing device of a user, obtain, over one or more networks, a network identification (ID) of a printer from the computing device, the network ID comprising printer specific information, wherein the printer is registered with a first cloud service provider, wherein the WOOBPE application launch causes the computing device to discover the printer and obtain the network ID from the printer, and wherein the user has no user account with a second cloud service provider;
    using the printer specific information obtained from the computing device of the user, create a new user account with the second cloud service provider for the user of the computing device;
    upon a creation of the new user account with second cloud service provider, provide a printer email ID to the computing device and activate the printer email ID based on the printer specific information; and
    claim the printer with the second cloud service provider by calling one or more associated application programming interfaces (APIs) of the second cloud service provider to send the printer specific information to the second cloud service provider and enable the second cloud service provider to associate the printer specific information with the user account in order to subscribe the user to one or more print services.

10. The non-transitory computer-readable storage medium of claim 9, wherein the executed instructions further cause to WOOBPE system to:
send a command to the first cloud service provider to cause the printer to print a test page upon successfully activating the printer email ID.

11. The non-transitory computer-readable storage medium of claim 10, wherein the printer automatically registers with the first cloud service provider in response to the user (i) selecting an ePrint option on the printer, and (ii) accepting an end user license agreement (EULA), and wherein sending the command to the first cloud service provider causes the first cloud service provider to send a print command to the printer to cause the printer to print the test page.

12. The non-transitory computer-readable storage medium of claim 9, wherein the computing device automatically launches the WOOBPE application upon scanning a near field communication (NFC) tag on the printer, and wherein obtaining the network ID of the printer from the computing device is based on the computing device scanning the NFC tag on the printer.

13. A web out-of-box print experience (WOOBPE) system comprising:
at least one processor, and
at least one memory storing instructions that, when executed by the at least one processor, cause the WOOBPE system to:
based on a WOOBPE application launch by a computing device of a user, obtain, over one or more networks, a network identification (ID) of a printer from the computing device, the network ID comprising printer specific information, wherein the printer is registered with a first cloud service provider, wherein the WOOBPE application launch causes the computing device to discover the printer and obtain the network ID from the printer, and wherein the user has no user account with a second cloud service provider;
using the printer specific information obtained from the computing device of the user, create a new user account with the second cloud service provider for the user of the computing device;
upon a creation of the new user account with second cloud service provider, provide a printer email ID to the computing device and activate the printer email ID based on the printer specific information; and
claim the printer with the second cloud service provider by calling one or more associated application programming interfaces (APIs) of the second cloud service provider to send the printer specific information to the second cloud service provider and enable the second cloud service provider to associate the printer specific information with the user account in order to subscribe the user to one or more print services.

14. The WOOBPE system of claim 13, wherein the executed instructions further cause the WOOBPE system to:
send a command to the first cloud service provider to cause the printer to print a test page upon successfully activating the printer email ID.

15. The WOOBPE system of claim 14, wherein the printer automatically registers with the first cloud service provider in response to the user (i) selecting an ePrint option on the printer, and (ii) accepting an end user license agreement (EULA), and wherein sending the command to the first cloud service provider causes the first cloud service provider to send a print command to the printer to cause the printer to print the test page.

16. The WOOBPE system of claim 13, wherein the computing device automatically launches the WOOBPE application upon scanning a near field communication (NFC) tag on the printer, and wherein obtaining the network ID of the printer from the computing device is based on the computing device scanning the NFC tag on the printer.

17. The WOOBPE system of claim 13, wherein the printer specific information comprises a unique serial number and a model number of the printer.

18. The WOOBPE system of claim 17, wherein the printer specific information further comprises at least one of a type of printer application to be added to the printer, white listing rules for the printer, a user ID, a password, and desired print services corresponding to the second cloud service provider.

19. The WOOBPE system of claim 13, wherein the printer email ID provided to the computing device is a default printer email ID that enables the user to create a personalized printer email ID, and wherein activating the printer email ID comprises activating the personalized printer email ID.

20. The WOOBPE system of claim 13, wherein providing the printer email ID to the computing device includes providing an option enabling the user to choose to download a printer driver upon successfully creating the user account.

* * * * *

UNITED STATES PATENT AND TRADEMARK OFFICE
CERTIFICATE OF CORRECTION

PATENT NO. : 9,990,165 B2
APPLICATION NO. : 14/765230
DATED : June 5, 2018
INVENTOR(S) : Lenin Fernandes et al.

Page 1 of 1

It is certified that error appears in the above-identified patent and that said Letters Patent is hereby corrected as shown below:

In the Claims

In Column 5, Line 44, Claim 1, delete "network," and insert -- networks, --, therefor.

In Column 7, Line 28, Claim 13, delete "processor," and insert -- processor; --, therefor.

Signed and Sealed this
Nineteenth Day of November, 2019

Andrei Iancu
*Director of the United States Patent and Trademark Office*